(12) United States Patent  (10) Patent No.: US 8,350,919 B2
Schindler  (45) Date of Patent: Jan. 8, 2013

(54) CONFIGURATION OF A DEVICE BASED UPON ORIENTATION

(75) Inventor: John Schindler, Ladera Ranch, CA (US)

(73) Assignee: Vizio, Inc., Irvine, CA (US)

( * ) Notice: Subject to any disclaimer, the term of this patent is extended or adjusted under 35 U.S.C. 154(b) by 155 days.

(21) Appl. No.: 12/878,050

(22) Filed: Sep. 9, 2010

(65) Prior Publication Data

US 2012/0062757 A1  Mar. 15, 2012

(51) Int. Cl.
*H04N 5/225* (2006.01)
*H04N 5/228* (2006.01)
(52) U.S. Cl. ................ 348/220.1; 348/208.16
(58) Field of Classification Search ............. 348/220.1, 348/208.2, 208.16
See application file for complete search history.

(56) References Cited

U.S. PATENT DOCUMENTS

2010/0149377 A1* 6/2010 Shintani et al. ............ 348/231.5

* cited by examiner

*Primary Examiner* — Yogesh Aggarwal
*Assistant Examiner* — Shahbaz Nazrul
(74) *Attorney, Agent, or Firm* — Law Office of Scott C. Harris, Inc.

(57) ABSTRACT

An application for a device that includes an image sensor, an orientation sensor and image capture capabilities. Operation of the device is based upon a detected orientation of the device by the orientation sensor. In one embodiment, when the device is in a horizontal orientation, the image capture operates as a digital still image camera and when the device is in a vertical orientation, the image capture operates as a digital video camera. Other orientations are anticipated including upside down as well as other operating modes such as flash enabled and flash disabled. Optionally, a control is provided to lock the operation in one of the modes irrespective of changes in the orientation of the device.

2 Claims, 4 Drawing Sheets

CONFIGURATION OF A DEVICE BASED UPON ORIENTATION

FIELD

This invention relates to the field of digital photography and more particularly to a system that utilizes orientation to configure an operating mode of an internal imaging device.

BACKGROUND

Photography has evolved from the early cameras using film plates, to cut sheets of film and later to standardized rolled film. Each step made photography more available to just about any user. Although still in use, mostly for professional photography, film cameras are quickly becoming a thing of the past.

An image sensor called a charge-coupled device was invented in 1969 at AT&T Bell Labs by Willard Boyle and George E. Smith and in shortly afterwards, Bell researchers made a charge-coupled device that could capture an image. These early devices were only capable of capturing images of a few hundred pixels, but these devices were truly the beginning of digital photography.

Today, the image sensors are capable of capturing images with resolutions containing over 10 million pixels (megapixels) and each pixel portraying up to 24 bits of color depth (e.g. using color filters and three image sensors).

Such image sensing enables current camera technology, but other technology shifts were required to make it as useful as it is today. One such technology is storage. Without compression, an image of 10 megapixels with 24 bit color depth requires 30 megabytes of storage. Fortunately, compression techniques have advanced to reduce this to closer to 3-5 megabytes per image. The compression requires significant processing resources while the storage of multiple images requires large amounts of storage. Improvements in processing, providing the performance needed to capture and compress images along with state memory such as solid state memory (e.g. Flash memory) or miniature rotating memory such as micro-hard disks. These technologies provided sufficient performance and storage for complete digital cameras that have become very affordable. Furthermore, advances in battery technology, such as lithium-ion, provides smaller, long-lasting power for these digital cameras.

Today, most digital cameras and many non-camera devices such as cellular phones have at least 4 gigabytes of storage and capture images with resolutions of from 2 megapixels to 16 megapixels. Many cell phones have integrated cameras capable of capturing still images and motion video.

There are two basic types of digital capture, still image capture and video capture. Digital still image cameras are usually capable of capturing motion video, but are not optimized for such. Likewise, video cameras are usually capable of capturing still images, but are optimized for motion video. These optimizations include physical features such as the size and shape, placement of the controls, view finders, holding straps, zoom controls, etc. In some examples, the optimizations include memory size, memory type, configuration, processor, battery, etc.

In general, to use a digital still image device to capture motion video, the user must set a control, either by a switch or through a menu. A similar operation is performed to use a digital video camera to take still images. When switching back and forth between still images and video, changing the control often becomes difficult due to the menu complexity or vision issues with switch settings, especially at night. For devices such as cellular phones, there is often a button to enter camera mode which, after operation, another button becomes the trigger, but the menu system must be used to change to video capture.

Still image cameras are often held differently than video cameras to promote a steady hand, whereas being steady isn't as important to be steady when taking video.

What is needed is a device that has image and video capabilities that detects how it is being held and automatically change between still digital imagery and video digital imagery.

SUMMARY

A device includes an image sensor and orientation sensor. Operation of the device is based upon a detected orientation of the device by the orientation sensor. In one embodiment, when the device is in a horizontal orientation, the device uses the image sensor to capture digital still images and when the device is in a vertical orientation, the device uses the image sensor to capture digital video. Other orientations are anticipated including upside down as well as other operating modes such as flash enabled and flash disabled. Optionally, a control is provided to lock the operation in one of the modes irrespective of changes in the orientation of the device.

In one embodiment, a device is disclosed including an image sensor optically interfaced to a lens and a processor electrically interfaced to the image sensor. The device has an orientation sensor also interfaced to the processor. A program running on the processor reads a value from the orientation sensor and sets a configuration of the device based upon the value.

In another embodiment, a method of controlling a configuration of a device is disclosed including reading an orientation sensor. If the orientation sensor indicates a first orientation, the configuration of the device is set to a first configuration; and if the orientation sensor indicates a second orientation, the configuration of the device is set to a second configuration.

In another embodiment, a device is disclosed including an image sensor optically interfaced to a lens with a processor electrically interfaced to the image sensor. A display, memory, and a lock control are electrically interfaced to the processor. An orientation sensor is interfaced to the processor and a program running within the processor reads a value from the orientation sensor and sets a configuration of the device based upon the value to either a still image configuration in which the processor captures still images from the image sensor and stores the still images in the memory or a video configuration in which the processor captures a series of frames from the image sensor and stores the frames as video in the memory.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
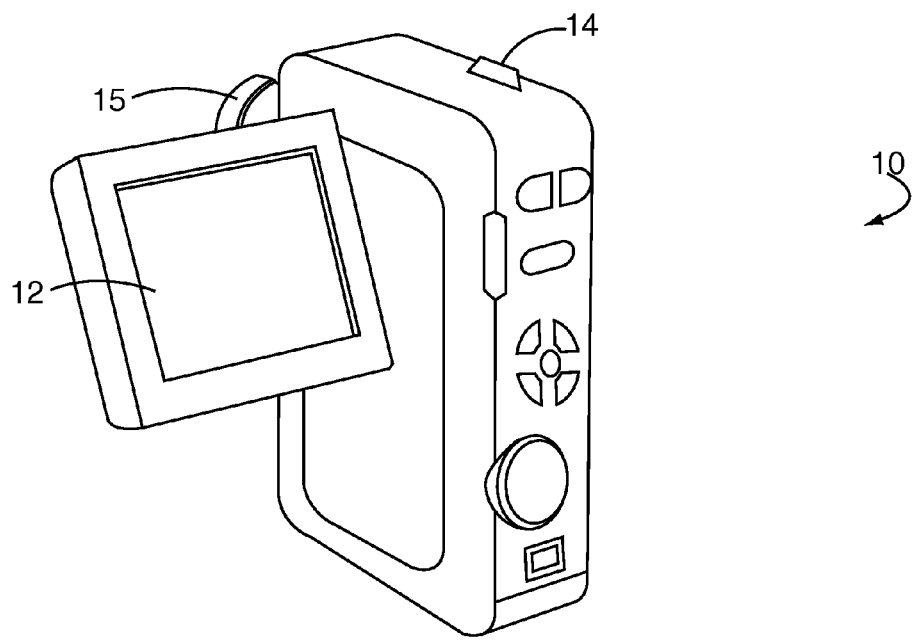
FIG. 1 illustrates a digital video camera of the prior art.

Reference will now be made in detail to the presently preferred embodiments of the invention, examples of which are illustrated in the accompanying drawings. Throughout the following detailed description, the same reference numerals refer to the same elements in all figures. Any size, shape or configuration of device is anticipated including digital cameras integrated into other devices such as cellular phones. It is anticipated that the orientation sensor is either a discrete sensor such as an accelerometer or mercury-filled switch or integrated into another component of the camera such as using the image sensor to determine orientation. In the latter, image analysis is used to determine orientation, for example, finding a person's eyes and making assumptions that the eyes are in a vertical plane, etc.

Referring to FIG. 1, a digital video camera 10 of the prior art will be described. The digital video camera 10 has a lens 15 through which an image is projected internally onto one or more image sensors (e.g. CCDs not shown). Some digital video cameras 10 of the prior art have view finders. This example uses a small display screen 12 to show the image that is visible through the lens 15 on the image sensor. The exemplary digital video camera 10 has a start/stop control 14 for stopping or pausing of the capture of the motion video.

Figure 2:
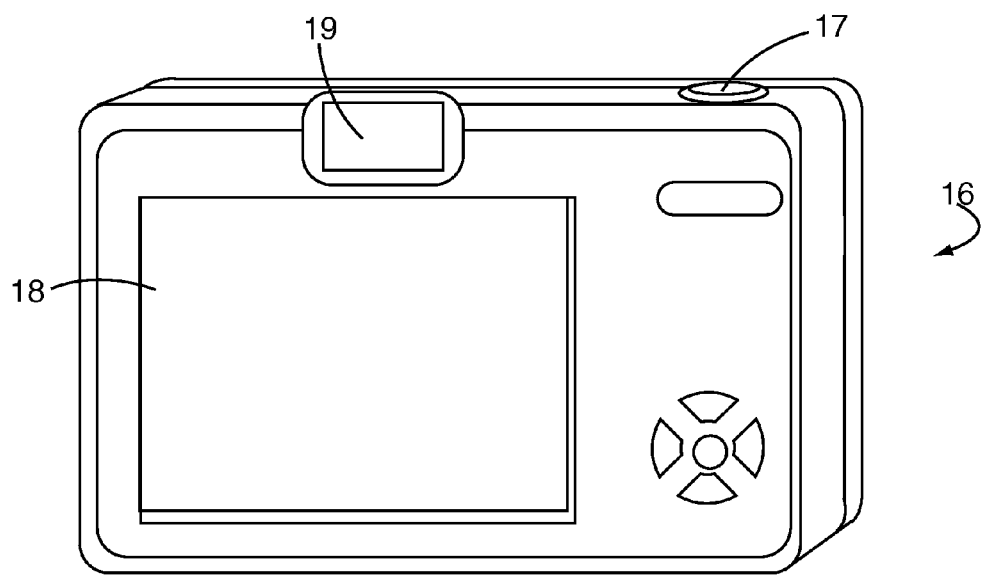
FIG. 2 illustrates a digital still image camera of the prior art.

Referring to FIG. 2, a digital still image camera 16 of the prior art will be described. The digital still image camera 16 has a lens (not visible) through which an image is projected internally onto one or more image sensors (e.g. CCDs not shown). Some digital still image camera 16 of the prior art have view finders 19. Some use a small display screen 18 to show the image that is visible through the lens on the image sensor. The exemplary digital still image camera 16 has a shutter control 17 for initiating the capture of an image.

Figure 3:
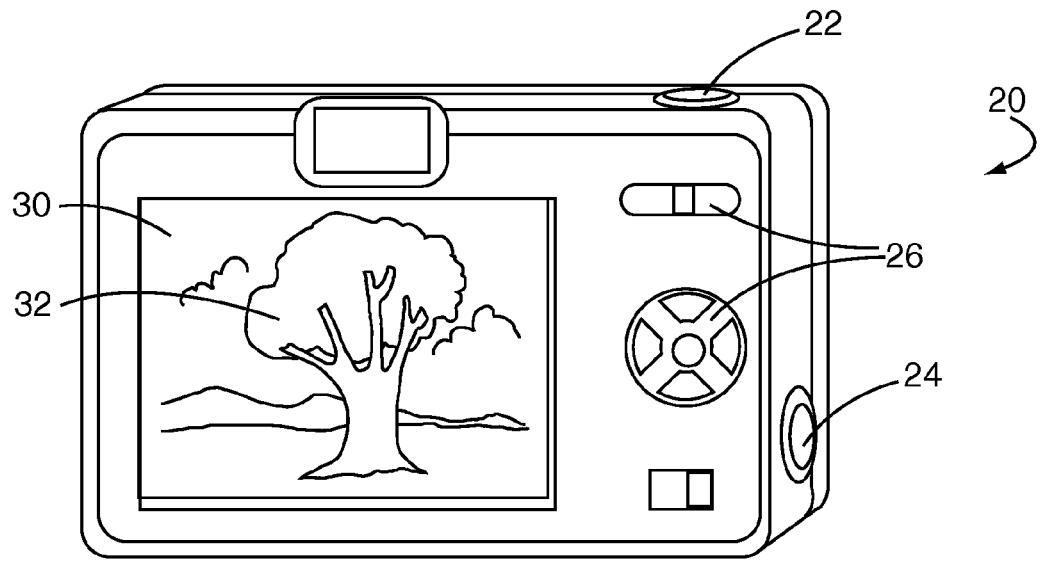
FIG. 3 illustrates a combination digital device in a horizontal orientation.
Figure 4:
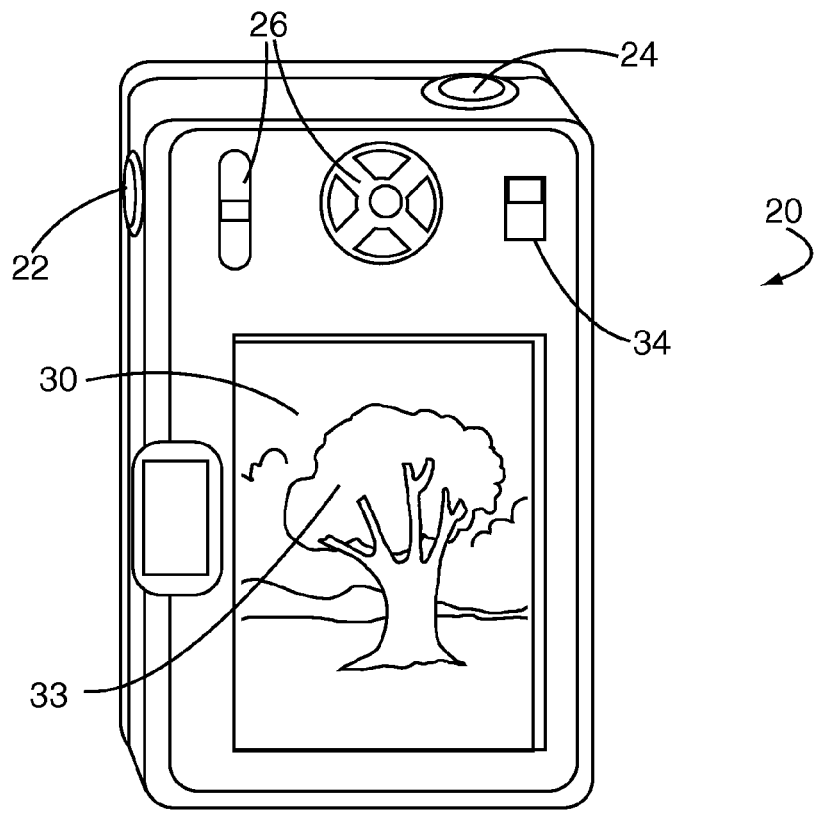
FIG. 4 illustrates the combination digital device in a vertical orientation.

Referring to FIGS. 3 and 4, a combination digital camera or other device 20 in a horizontal orientation (FIG. 3) and a vertical orientation (FIG. 4) will be described. The device 20 has an internal orientation sensor 102 (see FIG. 5) that detects whether the device 20 is being held in the horizontal orientation (as in FIG. 3) or the vertical orientation (as in FIG. 4). When in the horizontal orientation, the device 20 is configured one configuration, for example as a still image camera. When the device 20 is held in the vertical orientation, the device 20 is configured in a different configuration, for example as a motion video camera.

In the horizontal orientation (FIG. 3), the shutter control 22 us used to initiate capture of a still image 32 on the display 30. Other exemplary controls are present such as zoom in/out and menu controls 26, although there is no limitations as to what controls 26 are present. In the vertical orientation (FIG. 4), an alternate shutter control 24 is used to initiate capture of a video image 33 on the display 30, although the primary shutter control 22 is used in some embodiments. The same exemplary controls are present such as zoom in/out and menu controls 26.

In some embodiments, a lock control 34 is provided to lock the camera 20 in either the still image configuration of the motion video configuration. For example, when the lock control 34 is unlocked and the camera 20 is held horizontally, the camera 20 is configured to take still images. If then, the lock control 34 is moved to the lock position, then, even if the camera 20 is rotated to the vertical position, the camera 20 continues to take still images 32 instead of taking video images 33. Any type of lock control 34 is anticipated including slide switches, buttons and on-screen menus.

In one embodiment, the device 20 is a cellular phone 20 and, when held in portrait orientation, the device 20 functions as a cellular phone and when held in landscape orientation, the device 20 functions as a camera. In some versions of this embodiment, when rotated in one direction (e.g. right side of the phone 20 is up), the device 20 operates as a still image camera and when rotated in the opposite direction (e.g. left side of the phone 20 is up), the device 20 operates as a video camera. In some embodiments, there are user interface controls to lock out the camera feature and to set which rotation direction corresponds to still imaging and which rotation direction corresponds to video imaging.

Figure 5:
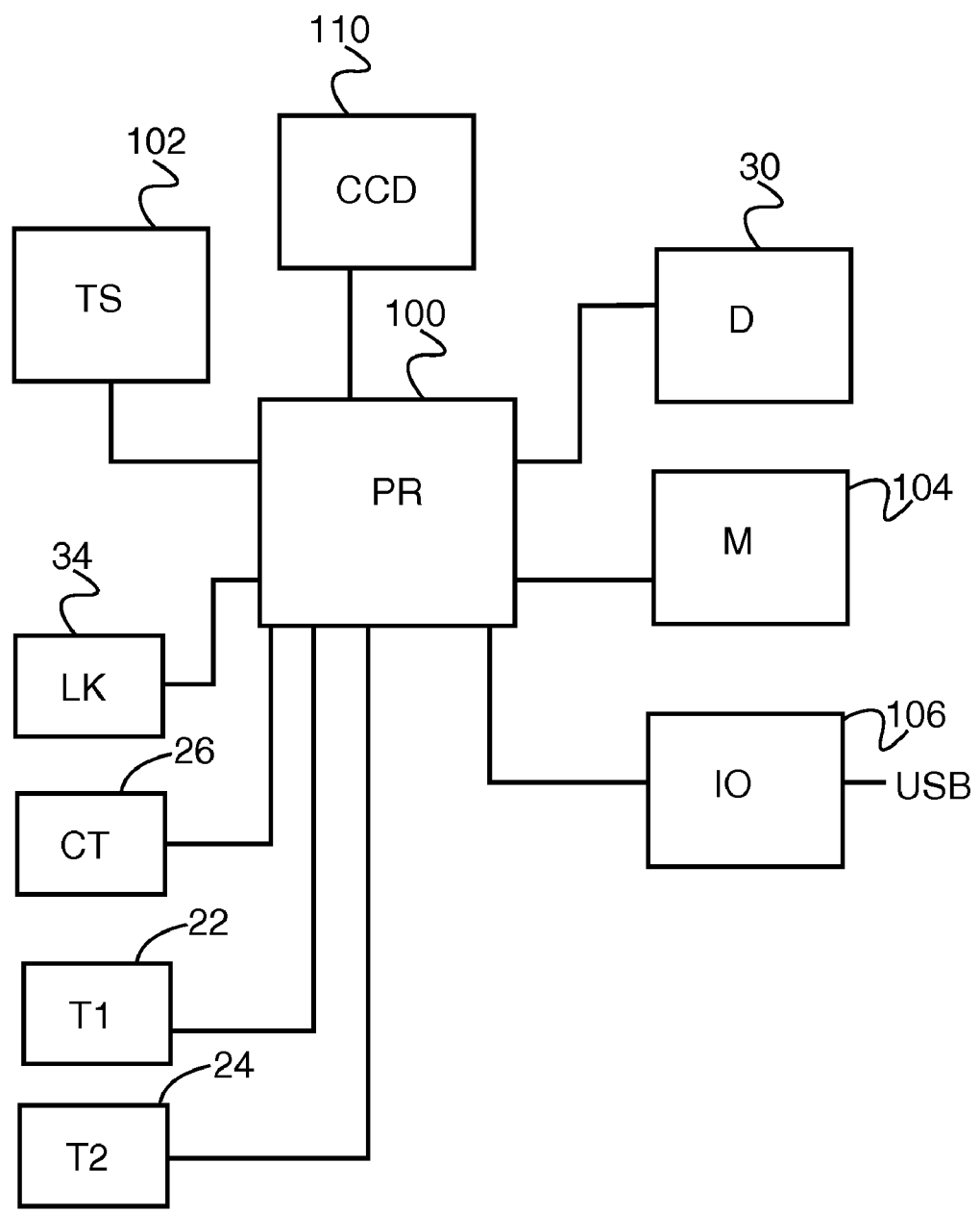
FIG. 5 illustrates a schematic view of a typical combination digital device.

Referring to FIG. 5, a schematic view of a typical combination digital camera 20 or digital camera section of a device 20 such as a cellular phone, etc, will be described. The camera 20 has processor 100 for controlling operation of the camera 20 and for capturing, compressing and storing images and/or video. One or more image sensors 110 (e.g. charge-coupled device) are interfaced to the processor for capturing a still image or a frame of a video movie. The processor 100 captures the image 32 and/or frames 33, processes them and stores them in a memory 104. Any type and size of memory 104 is anticipated including, but not limited to, internal or external flash, micro hard drives, other semiconductor memory, rotating memory (e.g., CD-RW), etc. In some embodiments, a display 30 is interfaced to the processor for displaying captured images 32 and/or video 33, for use as a view finder and/or for displaying menus and status of the camera 20.

An internal orientation sensor 102 is interfaced to the processor 100 and detects whether the camera 20 is being held in the horizontal orientation (as in FIG. 3) or the vertical orientation (as in FIG. 4). When the camera 20 is in the horizontal orientation, the orientation sensor 102 signals the processor of such and the processor configures the camera 20 in a first configuration, for example as a still image camera. When the camera 20 is in the vertical orientation, the orientation sensor 102 signals the processor of such and the processor configures the camera 20 in a second configuration, for example as a motion video camera.

Various controls 22/24/26 are interfaced to the processor 100 including, but not limited to, one or more triggers 22/24. The triggers 22/24, in the first configuration, initiate the capture of a still digital image and, in the second configuration, start and stop (or pause) the capture of a digital video.

In some embodiments, some or all of the memory 104 is removable, for example, Compact Flash or SD Flash memory cards. In such, the images and/or video are transferred to a computer system (not shown) by removing the memory card 104 and placing it in a memory card interface of the computer. In some embodiments, an input/output port 106 is provided such as Universal Serial Bus (USB) or Firewire for connecting the camera 20 to a computer to transfer the images and/or video from the camera memory 104 to the computer memory.

In some embodiments, a lock control 34 is interfaced to the processor 100. The lock control 34 locks signals the processor to lock the configuration of the camera 20 in either the still image configuration of the motion video configuration. For example, when the lock control 34 is unlocked and the camera 20 is held horizontally, the processor 100 configures the camera 20 to take still images. Now, if the lock control 34 is moved to the lock position; the processor maintains the current configuration even if the camera 20 is rotated to the vertical position. In this, the camera 20 continues to take still images 32 instead of taking video images 33. Any type of lock control 34 is anticipated including slide switches, buttons and on-screen menus.

Figure 6:
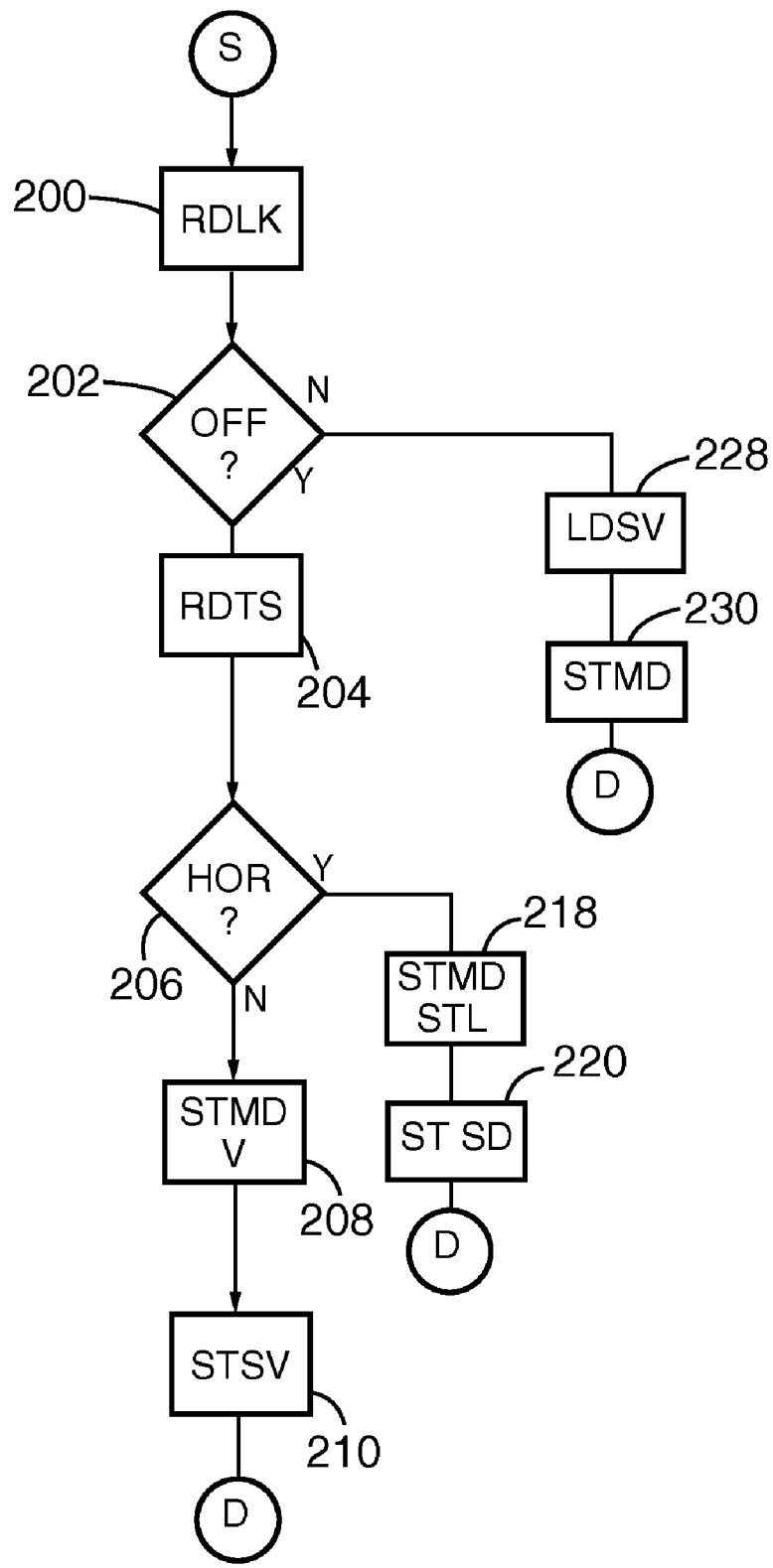
FIG. 6 illustrates a flow chart of the combination digital device.

Referring to FIG. 6, a flow chart of the combination digital camera will be described. This flow is executed in, for example, the processor 100 periodically or based upon an interrupt. First, the lock control 34 is read 200 to determine if the configuration of the camera 20 is locked. If the lock control 34 is not off (e.g. it is locked), the previously saved configuration is loaded 228 and the mode is set to the previous mode 230 (e.g. maintains the previous configuration independent of the orientation sensor 102). If the lock control 34 is off (e.g. it is unlocked), the orientation sensor 102 is read 204 to determine the orientation of the camera 20. If the orientation is horizontal 206, the configuration is set to, for example, still image mode 218 and saved 220 in case the lock control 34 is set to the lock position. If the orientation is vertical 206, the configuration is set, for example to motion video mode 208 and saved 210 in case the lock control 34 is set to the lock position.

Although the prior explanation maps horizontal orientation to still image photography and vertical orientation to video photography, it is anticipate that in some embodiments, the opposite relationship is maintained. Furthermore, it is also anticipated that other configuration changes occur based upon orientation, not necessarily still or motion capture. For example, in one orientation, the flash is enabled while in the other orientation; the flash is disabled, providing for quickly alternating between flash shots in one orientation and non-flash shots in the other. Other orientations are also anticipated such as rotating 180 degrees (upside down). For example, in one orientation, the flash is enabled and when turned upside down, the flash is disabled. This provides for quickly alternating between flash shots in one orientation and non-flash shots when held upside down while maintaining the same aspect ratio.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device comprising:
   a lens;
   an image sensor, the image sensor optically interfaced to the lens;
   a processor electrically interfaced to the image sensor; and
   an orientation sensor interfaced to the processor such that a program running within the processor reads a value from the orientation sensor and sets a configuration of the device based upon the value,
   wherein the value read from the orientation sensor is selected from at least one value representing a portrait orientation of the device, at least one value representing a left landscape orientation of the device, and at least one value representing a right landscape orientation of the device,
   wherein if the value indicates the portrait orientation of the device the configuration is set to disable a camera function, if the value indicates a first orientation from the group consisting of the left landscape orientation or the right landscape orientation of the device, the configuration is set to still camera function, and if the value indicates a second orientation from the group consisting of the left landscape orientation or the right landscape orientation of the device the configuration is set to video camera function.

2. The device as in claim 1, wherein said first orientation is left landscape orientation and said second orientation is right landscape orientation.

* * * * *